D. R. MAJOR.
NUT-LOCKS.
No. 195,379. Patented Sept. 18, 1877.
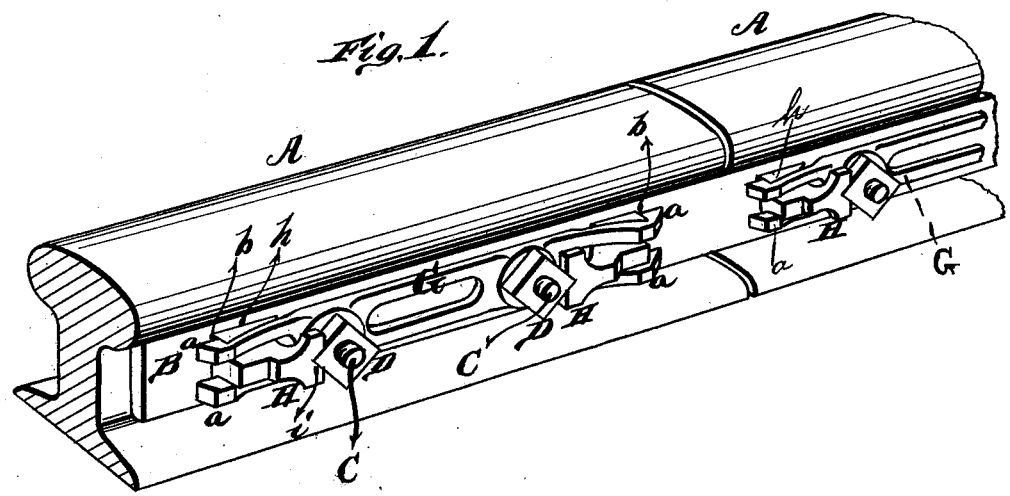
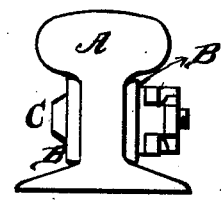
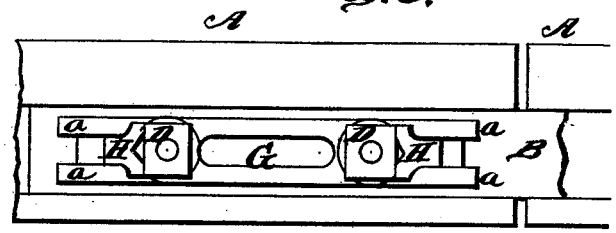
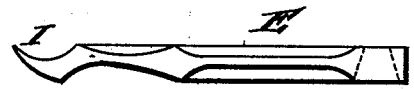
WITNESSES
Robert Everett
George E. Upham
INVENTOR.
David R. Major
Gilmore, Smith & Co.
ATTORNEYS.
N. PETERS, PHOTO-LITHOGRAPHER, WASHINGTON, D. C.

UNITED STATES PATENT OFFICE.

DAVID R. MAJOR, OF HUNTINGDON, ASSIGNOR TO J. M. MAJOR, OF WATSONTOWN, PENNSYLVANIA.

IMPROVEMENT IN NUT-LOCKS.

Specification forming part of Letters Patent No. 195,379, dated September 18, 1877; application filed August 18, 1877.

*To all whom it may concern:*

Be it known that I, DAVID R. MAJOR, of Huntingdon, in the county of Huntingdon and State of Pennsylvania, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my nut-lock applied to railroad-rails. Fig. 2 is an end view of the same. Fig. 3 is a side view. Fig. 4 is a detail view thereof. Fig. 5 is a perspective view of the angular locking-bar.

The nature of my invention consists in the construction and arrangement of a nut-lock, as will be hereinafter more fully set forth.

The annexed drawing, to which reference is made, fully illustrates my invention.

A A represent the ends of two adjoining railroad-rails. B B are the usual fish-bars, C C the bolts, and D D the nuts.

G represents a washer made long enough to fit over the ends of two bolts, C. The center of this washer may be slotted, as shown, or left solid, if desired. Each end of the washer is slotted longitudinally, forming two arms or prongs, $a\ a$, each of which has a notch and shoulder, $b$, formed on its inner side.

In each end of the washer G is inserted a lock-bar, H, made in the angular form shown, and formed with wedge-shaped flanges or wings $h\ h$.

After the nuts D have been tightened on the bolts against the washer, the lock-bar is inserted by passing the wings or flanges $h\ h$ under the ends of the arms $a\ a$, the body of the lock-bar entering the slot between said arms. The lock-bar is then driven in until the shoulders $b\ b$ catch on the back of the wings $h\ h$, when the lock-bar is thereby held in place, and the end of said bar bears against the side of the nut D, preventing the same from being turned.

In the end of the lock-bar H is a notch, $i$, which allows the corner of the nut to enter, if the nut should be in that position, when tightened, thus in either case locking the nut.

For removing the lock-bar I have provided a wrench, E, with a curved jaw or lip, I, at one end, which is to be inserted under the ends of the arms $a$, and said arms then pried outward until the shoulders $b$ clear the wings or flanges $h$, when the lock-bar can be pushed outward, and allow the nut to be turned.

What I claim as new, and desire to secure by Letters Patent, is—

1. The washer G, formed with the arms $a\ a$, having shoulders $b\ b$ in their inner sides, in combination with a locking-bar, substantially as set forth.

2. The combination of the angular locking-bar H, having wings or flanges $h\ h$, and the washer G, having arms $a\ a$, with shoulders $b\ b$, all substantially as and for the purposes set forth.

In testimony that I claim the above I have hereunto subscribed my name in the presence of two witnesses.

DAVID RINGGOLD MAJOR.

Witnesses:
SAML. W. COLLOM,
THOS. E. AFRICA.